Dec. 10, 1968 J. W. BREMER 3,416,146

CONTENT ADDRESSED MEMORY SYSTEM HAVING A GROUPED SELECTION CIRCUIT

Filed Dec. 21, 1964 2 Sheets-Sheet 1

INVENTOR
JOHN W. BREMER
BY Samuel E. Turner
ATTORNEY

Dec. 10, 1968 J. W. BREMER 3,416,146

CONTENT ADDRESSED MEMORY SYSTEM HAVING A GROUPED SELECTION CIRCUIT

Filed Dec. 21, 1964 2 Sheets-Sheet 2

INVENTOR
JOHN W. BREMER
BY
Samuel E. Turner
ATTORNEY

United States Patent Office 3,416,146

Patented Dec. 10, 1968

3,416,146

CONTENT ADDRESSED MEMORY SYSTEM HAVING A GROUPED SELECTION CIRCUIT

John W. Bremer, Sunnyvale, Calif., assignor to General Electric Company, a corporation of New York Filed Dec. 21, 1964, Ser. No. 419,876
13 Claims. (Cl. 340—173.1)

ABSTRACT OF THE DISCLOSURE

A selection circuit for use with an associative memory system whereby the time required for selection of each matching word in sequence is reduced by dividing the system into blocks and testing the blocks in parallel for the presence of matching words.

Figure 1:
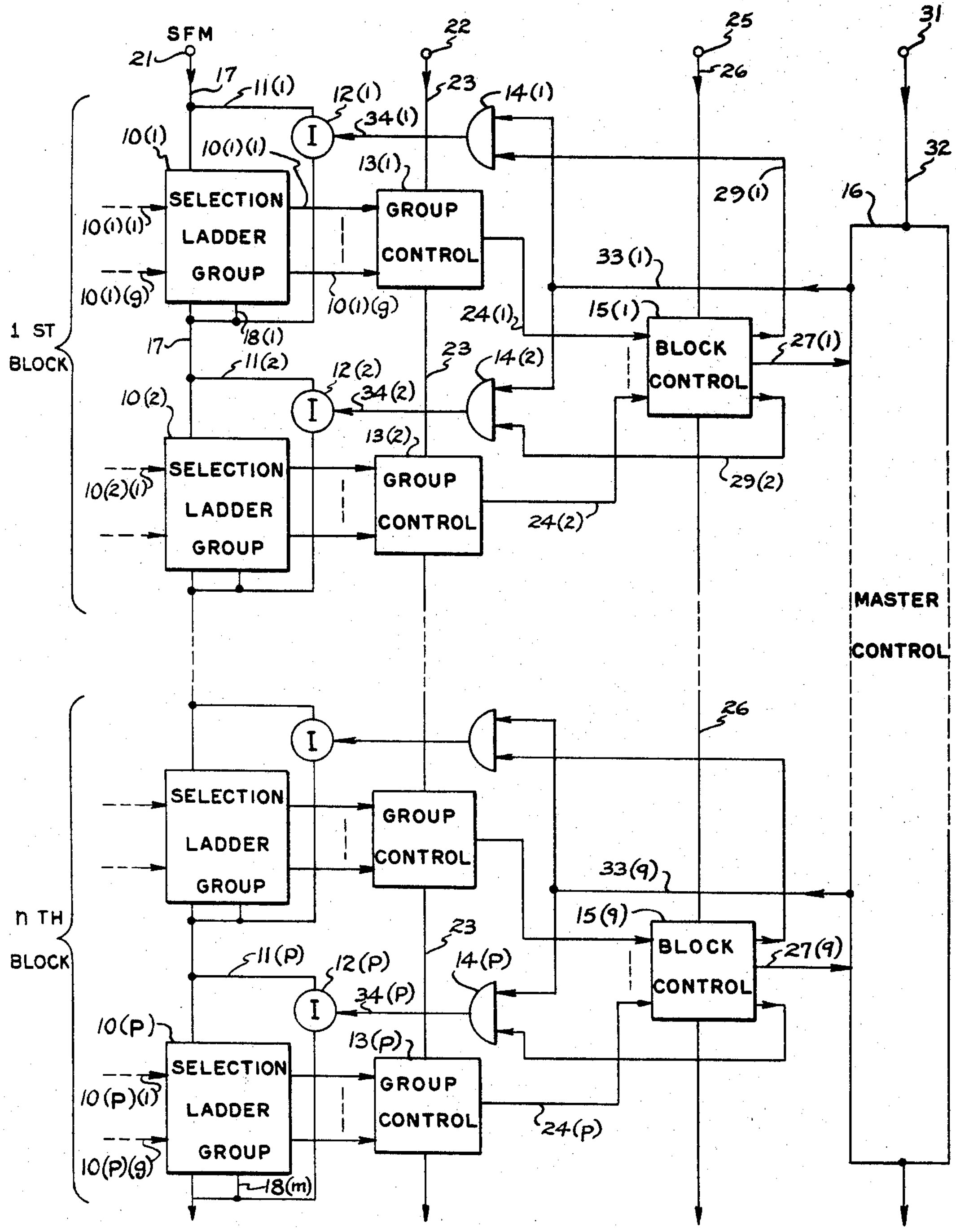

This invention relates to data storage and retrieval systems. The invention relates more particularly to a fast acting selection system for selecting in sequence each of several marked word storage locations.

The invention may be used, for example, in a content-addressed or associative memory system, wherein data is stored as a plurality of discrete data words, to decrease the selection time required to enable a word location for write and read operations.

Associative memory systems are now known wherein all of the stored words are interrogated substantially simultaneously and wherein a stored word may be retrieved in response to an interrogation of selected parts of the word. For example, in such a data processing system the data words may contain certain data facts concerning employees such as the number of years of service, social security number, salary and the like. An entire data word may be retrieved in response to an interrogation for only one data fact of the several data facts constituting a data word. Thus, for example, the records of all employees having a given number of years of service may be retrieved in response to one interrogation.

In such search operations, it is clear that there is frequent occurrence of multiple comparisons, that is, more than one data word in the memory may match the interrogation word. It is often desirable to select such matching words in sequence. That is, the first matching word is selected while the selection of all other matching words is inhibited. After the desired operations are performed on the first word, the second matching word is selected, the selection of all others being inhibited, and so forth.

A data processing system which can perform the above-described operations is disclosed by John W. Bremer, Dwight W. Doss and Bruce T. McKeever in a copending U.S. patent application Ser. No. 269,371, filed Apr. 1, 1963, now Patent No. 3,311,898 entitled "Content Addressed Memory System" which is assigned to the same assignee as the present invention. In that application there is disclosed a cryogenic embodiment of a data processing system wherein a plurality of storage cells are arranged in rows and columns, each row of storage cells being adapted to store a data word. That system further includes a circuit called a "select-first-match circuit," abbreviated SFM circuit, which cooperates with a plurality of match-indicating circuits, one of which is associated with each row of storage cells, for sequentially selecting each matching word in turn.

The SFM circuit therein disclosed is in the nature of a current-directing, cryotron-controlled ladder circuit. It comprises a pair of lines with a connecting rung in each row, the applied current being directed down the first line or through the rung and thence down the second line depending on the state of the match-indicating circuit of the associated row.

Because of the inductive and resistive effects, a finite "settling" time is required in each row before it is determined whether the applied current will be directed down the first line or be directed through the rung and down the second line. In other words, a certain delay is encountered in each row before the applied current reaches a predetermined percentage of its final value in one line or the other between the rungs of the ladder circuit, that is, between rows.

The SFM circuit is thus, in effect, a serially operating circuit wherein the decision as to whether a given row of storage cells contains a matching word must be made before a similar decision can be made as to the next successive row, etc. The delay is thus cumulative. Since ordinarily the system operation must be based upon the worst case or longest delay time, it is evident that the settling time that must be allowed for operation of such a selection circuit may be undesirably long in a memory system having a storage capacity of thousands of words.

It is therefore an object of the invention to provide an improved selection circuit.

More specifically it is an object of the invention to reduce the time that must be allowed for operation of a circuit for selecting in sequence each word storage location that has been indicated for selection.

These and other objects of the invention are achieved by providing several levels of control circuitry by which a greatly increased degree of simultaneity of operation is achieved. For example, according to an illustrated embodiment, the memory system comprises a plurality of rows of cryotron circuitry, each row being adapted to store a word. Each row also contains a match-indicating circuit and a selection control circuit which cooperate with a select-first-match or SFM circuit that traverses all of the rows.

To provide an increased degree of simultaneity in the operation of the SFM circuit, the memory is organized into several levels. In the illustrated embodiment, the rows are first organized into a plurality of groups, each group comprising a plurality of successive rows. The groups, in turn, are organized into blocks, each block containing a plurality of successive groups. Corresponding levels of control circuitry are provided; namely, a group control circuit, a block control circuit and an overall or master control circuit.

Simultaneity of operation is achieved as follows: the group control circuit is arranged to provide simultaneous indications from each group as to whether or not a group includes a row which contains a matching word. These group indications are transmitted to the block control circuit which then provides simultaneous indications of the blocks that contain matching words. These block indications are transmitted to the master control circuit which thereupon operates to enable the SFM circuit in the first group which contains a matching word and in all preceding groups.

By providing this control circuitry the legs of the SFM circuit can be joined between groups and a group bypass line can be provided to pass the SFM current around the SFM circuit in the groups that are not enabled.

Because the legs of the SFM circuit ladder are joined between groups, the SFM current is in effect applied substantially simultaneously to all groups. Thus in the selection system of the invention the required selection time has been reduced to the sum of the time of operation of the group, block and master control circuits plus a settling time of the SFM circuit ladder approximating the settling time of the SFM circuit ladder in only one group.

Figure 2:
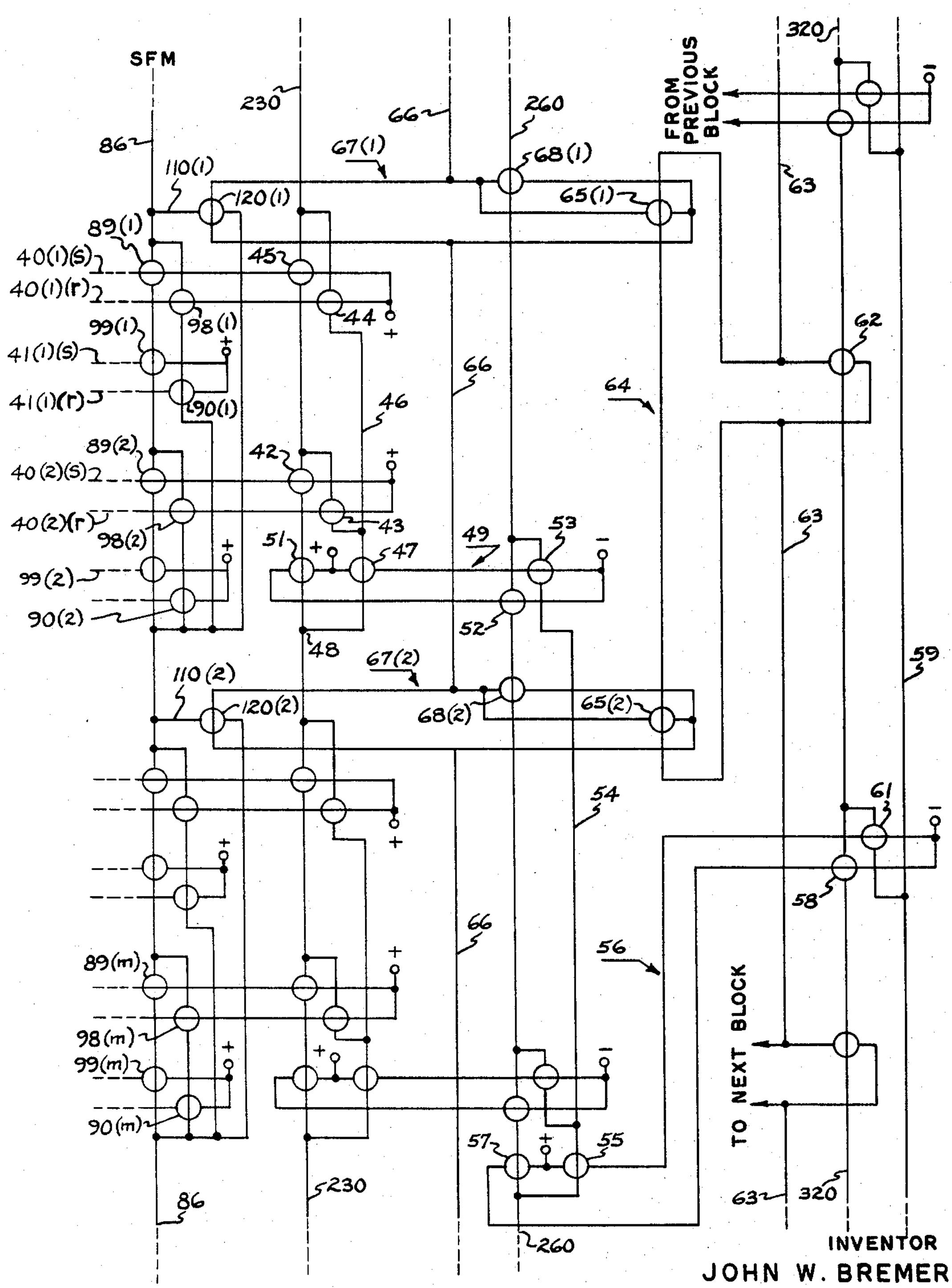

The invention is described more specifically in the following detailed description of an illustrated embodiment with reference to the accompanying drawings in which:

FIGURE 1 is a block diagram of a selection system according to the invention; and FIGURE 2 is a schematic illustration of representative portions of a selection system according to the invention employing cryogenic circuitry.

To readily illustrate the structure, organization and operation of the selection system of the invention, a block diagram of such a system is shown in FIG. 1. The circuit includes a plurality of selection ladder groups 10(1)–10(p), a plurality of group shunt lines 11(1)–1(p), a plurality of shunt line inhibit gates or switches 12(1)–12(p), a plurality of group control circuits 13(1)–13(p), a plurality of group control gates 14(1)–14(p), a plurality of block control circuits 15(1)–15(q) and a master control circuit 16.

Prior selection ladder circuits used in content-addressed memories or the like, for example, the SFM circuit shown and described in the previously mentioned U.S. patent application Ser. No. 269,371, are formed by a pair of parallel lines connected at each word location or row of storage cells by a switchable rung controlled by a match-indicating circuit.

In the present system the word locations or rows of storage cells are organized into groups of successive rows and the lines of the selection ladder circuit are joined between such groups. For example, the selection ladder group 10(1) contains a pair of selection ladder lines 17 and 18(1), line 18(1) joining line 17 and line 17 continuing downward to selection ladder group 10(2), etc.

As discussed hereinbefore, the selection system of the invention is designed to provide rapid, sequential selection of the rows of a memory system which contain words that match an interrogation word. In FIG. 1, a plurality of line 10(1)(1)–10(p)(g) starting at the left of the selection ladder groups and terminating in the group control circuits (such as lines 10(1)(1)–10(1)(g)) associated with selection ladder group 10(1) and group control circuit 13(1) are match-indicating signal lines each from a respective word storage location or row of storage cells. After an interrogation operation (described in the previously mentioned patent application Ser. No. 269,371), which precedes the selection operation, a match-indicating signal appears on each of lines 10(1)(1)–10(p)(g) that corresponds to a word storage location or row of storage cells containing a matching word.

Each of the selection ladder groups 10(1)–10(p) is shunted with a respective one of the shunt lines 11(1)–11(p), each shunt line including a respective one of the gates 12(1)–12(p) by which it is controlled. Gates 12(1)–12(p) are of the inhibit type, that is, in the absence of control signals applied to these gates the group shunt lines 11(1)–11(p) are enabled. When all of the group shunt lines 11(1)–11(p) are enabled and a current is applied to a terminal 21 substantially all of this current passes through the shunt lines 11(1)–11(p) and the selection ladder group ladder circuits are bypassed. In cryogenic circuitry this result is based upon the principle that a current applied to parallel superconductive circuits will divide in inverse proportion to the inductance of the branches. In the present case, the inductance of the ladder circuit of each selection ladder group is much greater than the inductance of the associated group shunt line. (In non-superconductive circuits an AND gate could be provided in the input line to each selection ladder group and such gates could be enabled by the signals applied to nhibit gates 12(1)–(12(p).)

As mentioned hereinbefore, the system is organized into a plurality of blocks with each block including a plurality of selection ladder groups. Each group is provided with a group control circuit such as the group control 13(1) for selection ladder group 10(1). Each group control circuit provides a group indicating signal to an associated block control circuit in the event that the group contains a word that matches an interrogation word. For example, group control circuits 13(1) and 13(2) provide such signals on a pair of lines 24(1) and 24(2).

In response to signals from the group control circuits the block control circuits provide block indicating signals to the master control circuit 16. The block control circuits also control the group shunt lines jointly with the master control circuit through the agency of AND gates 14(1)–14(p) and inhibit gates 12(1)–12(p).

An example of operation of the selection circuit of FIG. 1 can now be described. For the purpose of this example of operation, it is assumed that an interrogation operation has been performed and that match-indicating signals are consequently present on lead 10(2)(1) in selection ladder group 10(2) of the 1st block and on lead 10(p)(1) in selection ladder group 10(p) of the nth block, thus indicating matching words in the corresponding word storage locations.

The first step in the sequence of the selection operation is the application of a group control signal to a terminal 22 connected to a group control line 23. Since there are no match-indicating signals on the lines 10(1)(1)–10(1)(g) of the first selection ladder group 10(1) no signal is produced on line 24(1) by group control circuit 13(1). However, in joint response to the match-indicating signal on line 10(2)(1) and the group control signal on line 23, the group control circuit 13(2) produces a group indicating signal on line 24(2) which is applied to the block control circuit 15(1). Similarly, the group control circuit 13(p) produces a group indicating signal on a line 24(p) which is applied to block control circuit 15(q).

The second step in the sequence of the selection operation is the application of a block control signal to a terminal 25 connected to a block control line 26. In joint response to the receipt of the block control signal on line 26 and the group indicating signal on line 24(2) the block control circuit 15(1) transmits a block indicating signal via a line 27(1) to the master control circuit 16.

Important to the understanding of the operation of the block control circuitry is the fact that the first block control circuit to receive concurrent block control and group indicating signals operates to divert the block control signal from the block control line 26. Thus in the present example the block control circuit 15(1) diverts the block control signal from line 26 and, therefore, the block control circuit 15(q), and all intervening block control circuits, does not receive the block control signal. Thus, even though the block control circuit 15(q) is in receipt of a group indicating signal on line 24(p), the absence of a block control signal forestalls the transmission of a block indicating signal on a line 27(q) to the master control circuit.

It is also important to note that any block control circuit that receives the block control signal on line 26 responds thereto to provide enabling signals to the AND gates of that block. The concurrence of a group indicating signal and the block control signal is not required to produce these enabling signals. As a consequence, the AND gates in the block containing the first group indicating signal (indicative of the first matching word) as well as the AND gates of all preceding blocks will be enabled. (The AND gates of lower or subsequent blocks will not be enabled because of the diversion of the block control signal from line 26 as described above.) Thus, in the present example, the block control circuit 15(1) produces enabling signals on a pair of lines 29(1) and 29(2) to AND gates 14(1) and 14(2), respectively, while block control circuit 15(q) does not produce such signals.

The third step in the sequence of the selection operation is the application of a master control signal to a terminal 31 connected to a master control line 32. The master control circuit 16 includes a plurality of circuits arranged in sequence, one for each of the blocks, to which the master control signal is sequentially applied. In response to the master control signal on line 32, the master control circuit 16 operates to provide an enabling signal on each of the ones of a plurality of block enabling lines 33(1)–33(*q*) which are above and including the first block from which a block indicating signal is received on the corresponding one of the lines 27(1)–27(*q*).

Furthermore, the concurrence of a block indicating signal and the master control signal results in diversion of the master control signal from the line 32 to thereby prevent enablement of the AND gates in the blocks below the first block which contains a matching word. Thus in the present example, an enabling signal is applied to AND gates 14(1) and 14(2) via line 33(1) and the concurrence of a block indicating signal on line 27(1) and the master control signal on line 32 causes diversion of the master control signal from line 32 whereby an enabling signal is not produced on block enabling line 33(*q*).

At the conclusion of the sequence of operations set forth above, both AND gates 14(1) and 14(2) are enabled by signals on lines 29(1), 29(2) and 33(1). These gates therefore produce output signals on a pair of respective leads 34(1) and 34(2) of a plurality of AND gate output leads 34(1)–34(*p*). The signals on leads 34(1) and 34(2) enable the inhibit gates 12(1) and 12(2) whereby the group shunt lines 11(1) and 11(2) are disabled. The shunt lines of subsequent selection ladder groups remain enabled.

Thus, if a select first match (SFM) signal is now applied to terminal 21, this signal will be directed through the selection ladders of selection ladder groups 10(1) and 10(2) but will flow through the shunt lines of subsequent groups. Receipt of the SFM signal by selection ladder group 10(2) results in the enablement for read or write operations of the row corresponding to the match-indicating signal line 10(2)(1) as described in the previously mentioned patent application Ser. No. 269,371, for example. Also, as described therein, the performance of a read or write operation clears the match-indicating signal from the line 10(2)(1) and at the conclusion of such operation, the system is ready for the selection of the next matching word.

In the present example, the next matching word is indicated by a match indicating signal on line 10(*p*)(1) of group 10(*p*) of the nth block. To select the row or word storage location corresponding to line 10(*p*)(1) the selection sequence described hereinbefore is repeated, control signals being sequentially applied to terminals 22, 25 and 31 followed by an SFM signal applied to terminal 21. It is noted, however, that sequential application of the control signals may not be required. Depending on the nature of the circuitry employed some or all of the control signals may be applied simultaneously. In any case, the settling time of the control circuits is more than compensated for by the decreased settling time of the selection ladder which is achieved by the joining of the selection ladder lines between groups whereby the SFM signal is effectively applied simultaneously to all of the selection ladder groups.

For purposes of emphasizing the advantages of the selection system of the present invention, it is desirable to compare the settling time required thereof with the settling time of the ordinary ladder circuit making reasonable assumptions for simplicity. The operating time of a system includes the settling time $T_s$ of the individual circuits plus the transfer time $T_t$ of the signals from circuit to circuit.

In the selection circuit of the invention, as illustrated in FIG. 1, the selection time includes the settling time of the group control crcuits, the transfer time of the signals from the group control circuits to the block control circuits, the settling time of the block control lirsuits, the transfer time from the block control circuits to the master control circuit, the settling time of the master control circuit, the transfer time from the master control circuit to the group gating circuits, the settling time of the group gating circuits, the transfer time from the group gating circuits to the selection ladder group shunt circuit gates, the settling time of the shunt circuit gates, and the settling time of the selection ladder groups. (In the present case, the settling time of the selection ladder groups approximates the settling time of only one of the groups since all groups effective receive the SFM current simultaneously.)

If the above set forth series of times it is assumed that all settling times are equal and all transfer times are equal, then, to a first approximation the total operation time T of the system of FIG. 1 may be symbolically expressed as: $T=5T_s+5T_t$. If it is further assumed that the settling and transfer times are equal, the foregoing expression reduces to: $T=10T_s$. It is to be noted that a significant advantage of the present selection system is that the selection time remains substantially constant with variations in the size of the system, that is, additional groups and extensions of the control circuitry do not substantially increase the selection time.

By way of contrast, the operating time of a conventional ladder circuit system is dependent on its length, that is, upon the number of words in the memory system. For purpose of comparison, assume that a system of 420 selection ladder groups is connected as a conventional ladder circuit (that is, without joining of the ladder lines between groups). In such a case, the settling times of the groups are at least additive and, therefore, the settling time for the system would be at least $420T_s$ as compared to $10T_s$ for the system of the present invention.

While the accuracy of the assumptions made to simplify the foregoing comparison may be questioned, it is clear that in a memory system of practical minimum size, that is, several hundreds of word groups or more, the selection system of the invention offers a very substantial reduction in the selection circuit operating time.

An embodiment of the selection system of the invention formed of cryogenic circuitry is shown in FIG. 2. This embodiment is designed to be compatible with the memory system of the previously mentioned U.S. patent application Ser. No. 269,371. As therein described, such circuitry is formed of networks of superconductive conductors and superconductive switches now well-known as cryotrons. Cryotrons and cryotron circuits are also described by the inventor, John W. Bremer, in a book entitled Superconductive Devices, McGraw Hill Book Co. Inc., New York, 1962.

Briefly, certain electrical conductors are known to exhibit a loss of electrical resistance at supercold temperatures approaching absolute zero and to regain resistance in the presence of a certain critical magnetic field, the critical field depending upon the particular superconductive material as well as its temperature. Superconductive materials, such as lead, requiring comparatively high critical fields for return of resistance are known as "hard" superconductors while those requiring comparatively low critical fields, such as tin, are known as "soft" superconductors.

In its preferred thin-film form, a cryotron comprises a gate conductor film of soft superconductive material which is crossed by a narrow control conductor film insulated therefrom and preferably formed of hard superconductive material. Both the gate conductor and the control conductor are thus normally in the superconducting state. If sufficient current is caused to flow through the control conductor the resulting magnetic field causes the gate conductor to become resistive in the region of the crossover.

To prevent resistive losses the interconnecting conductors of cryogenic circuitry are also formed of superconductive material. Also for reduced losses, cryotrons are advantageously employed in current-directing circuitry. That is, parallel superconductive paths are provided for all currents and a current is directed along a selected path by making the other paths resistive by means of cryotrons in these paths. It is noted that a current thus directed and established through a superconductive one of several parallel paths remains in that path even though one or more of the other paths is allowed to again become superconductive.

In the circuit shown in FIG. 2, cryotrons are schematically represented by a circle crossed with a line, the circle representing the gate conductor and the crossing line representing the control conductor. Thus a current through the crossing line (the control renders resistive the underlying circle (the gate).

The circuitry illustrated in FIG. 2 constitutes one block of the selection circuit of a system. The block as illustrated in cludes two groups of two-word circuits each. In a complete system this circuit may be repetitively extended above and/or below to provide the desired number of blocks. Similarly, each block may be expanded to include a greater number of groups and each group may be expanded to include more words.

In order to more conveniently relate the elements of FIG. 2 to the block diagram of the system of FIG. 1, where practical, corresponding structure is identified with similar reference numbers multiplied by ten, it being assumed that the block illustrated in FIG. 2 corresponds to the 1st block of FIG. 1. Thus in FIG. 2 a line 230 is the group control signal line, a line 260 is the block control signal line, a line 320 is the master control signal line and a plurality of lines 110(1)–110(2) are group shunt lines each containing a respective one of a plurality of cryotrons 120(1)–120(2) which correspond to the inhibit gates 12(1)–12(2) of FIG. 1.

Similarly, to show the cooperation of the selection circuit of FIG. 2 with the memory system of the previously mentioned patent application Ser. No. 269,371, the SFM line and the SFM ladder cryotrons are given the same reference numbers as are given to corresponding structure in that application. Thus the SFM line is indicated as a line 86 (corresponding to line 17 of FIG. 1), a plurality of cryotrons **89(1)–89(*m*) and 98(1)–98(*m*) are cryotrons controlled by match-indicating flip-flop circuits and a plurality of cryotrons 90(1)–90(*m*) and 99(1)–99(*m*)** control selection flip-flop circuits.

As mentioned hereinbefore, the cryogenic circuitry of FIG. 2 is of a current directing nature. Thus, there are several parallel circuits which are connected to sources, not shown, to receive a constant direct current at terminals marked with "+" and "−" symbols.

If there is no current flow through the controls of cryotrons 120(1)–120(2), the gates thereof will be superconductive and, therefore, the group shunt lines 110(1)–110(2) will be superconductive. In such a case, if current is applied to the SFM line 86, this current will flow through the group shunt lines 110(1)–110(2) rather than through the selection ladders because of the much larger inductance of the latter.

Assume, however, that the gate of cryotron 120(1) is resistive which thus renders resistive the group shunt line 110(1). In this event a current applied to SFM line 86 will be directed through the selection ladder of the first illustrated group. At the first illustrated row of the first group, cryotrons 89(1) and 98(1) determine whether this current will take a path through the gate of cryotron 89(1) and the control of cryotron 99(1) or a path through the gate of cryotron 98(1) and the control of cryotron 90(1).

Cryotrons 89(1) and 98(1) are controlled by currents in a pair of parallel lines **40(1)(*s*) and 40(1)(*r*) which are portions of the set and reset output lines, respectively, of a match-indicating flip-flop circuit of the first row. There is always a current in one or the other of lines 40(1)(*s*) and 40(1)(*r*) but not in both at the same time. Thus, if the current is flowing in line 40(1)(*s*), which indicates that the first row contains a matching word, the gate of cryotron 89(1) is resistive and therefore the current in line 86 flows in the path through cryotrons 98(1) and 90(1)** and the selection circuits of the other rows of the group are bypassed.

A pair of lines **41(1)(*s*) and 41(1)(*r*) are portions of the set and reset input lines, respectively, of a selection flip-flop circuit of the first illustrated row. The SFM current through the control of cryotron 90(1) renders the gate thereof resistive. Thus the line 41(1)(*r*) is resistive and therefore the selection flip-flop current flow is in the set line 41(1)(*s*)**. Current in this line enables the row for read and/or write operations as explained in the previously mentioned patent application.

On the other hand, if the match-indicating flip-flop current had been flowing in line **40(1)(*r*), indicating that the first row did not contain a matching word, cryotron 98(1) would have been resistive rather than cryotron 89(1). Thus the SFM current would have passed through cryotrons 89(1) and 99(1) to the selection circuit of the next row comprising cryotrons 89(2), 90(2), 98(2) and 99(2), this SFM current through the control of cryotron 99(1) causing the gate thereof and hence line 41(1)(*s*)** of the selection flip-flop of the first row to be resistive thus resetting this selection flip-flop.

The lines of each match-indicating flip-flop are extended to the right to include a pair of cryotrons in the group control circuit. For example, the lines **40(2)(*s*) and 40(2)(*r*) include the controls of a pair of cryotrons 42 and 43**, respectively, these cryotrons being in a ladder circuit which forms the group control circuit.

To further illustrate the structure and operation of the circuit of FIG. 2, assume by way of example that as a result of an interrogation operation a match-indicating flip-flop current is flowing in the set line **40(2)(*s*)** of the match-indicating flip-flop of the second row, thus indicating a matching word in this second row. (It is assumed that there are no other matching rows in this block. Thus currents are through the reset lines of the match-indicating flip-flops of the other rows of the block.)

The first step in the sequence of the selection operation is the application of a group control current to the group control line 230. A cryotron 44 is resistive due to current in line **40(1)(*r*). Thus, the group control current flows through the gate of a cryotron 45. The gate of cryotron 42 is resistive due to the match-indicating current in line 40(2)(*s*) which includes the control of cryotron 42. Thus, the group control current is diverted through the superconductive control of cryotron 43 which is in a rung between line 230 and a bypass line 46 of the group control ladder circuit of the first group. The group control current therefore flows through the control of a cryotron 47 to a junction 48 between lines 230 and 46 and thence down line 230** to the group control ladder circuit of the second group.

The cryotron 47 is a part of a group indicating transfer circuit 49, between the group control circuit and the block control circuit, by which a group indicating signal is transmitted to the block control circuit. Transfer circuit 49 provides parallel paths for a transfer current applied between its + and − terminals. When the gate of cryotron 47 is rendered resistive by the group control current through its control, the transfer current in circuit 49 is diverted through the superconductive gate of a cryotron 51 and through the control of a cryotron 52. Cryotron 52 is in a ladder circuit of the block control circuit.

The next step in the sequence of the selection operation is the application of a block control current to the block control line 260. Since the gate of cryotron 52 is resistive, the block control current on line 260 is diverted through the superconductive gate of a cryotron 53 which is in a rung between ine 260 and a bypass line 54 of the block control ladder circuit. Thus diverted, the block control current flows down line 54, through the control of a cryotron 55, and thence returns to line 260 to be applied to subsequent blocks (not shown).

The cryotron 55 is a part of a block indicating transfer circuit 56 between the block and master control circuits. Transfer circuit 56 provides parallel paths for a transfer current applied to the + and − terminals thereof. Thus, with the control of cryotron 55 resistive, this transfer current flows through the superconductive gate of a cryotron 57 and thence through the control of a cryotron 58. Cryotron 58 is in a ladder circuit of the master control circuit which includes line 320 and a bypass line 59 with a connecting rung for each block. For the ilustrated block the connecting rung includes the gate of a cryotron 61.

The next step in the sequence of the selection operation is the application of a master control current to the master control line 320. With the gate of cryotron 58 resistive (and assuming that the master control current has not been diverted to the bypass line 59 at the rung of a previous block) the master control current is diverted through the superconductive gate of cryotron 61 to the bypass line 59 wherein it remains through the subsequent blocks of the system. In other words, the master control current is diverted from the master control line at the block containing the first matching word whereby subsequent blocks will not be enabled for selection regardless of whether they contain matching words. It is noted that the master control current in line 320 flows through the control of a cryotron 62 thus rendering the gate thereof resistive.

The next step in the sequence of the selection operation is the application of a block enabling current to a block enabling control line 63. This line, which may be considered a part of the master control circuit, includes a block enabling transfer circuit for each block, such as a transfer circuit 64 for the illustrated block. (These transfer circuits constitute the signal channels from the master control circuit back to the block control circuit and they correspond to the lines 33(1)–33(2) of FIG. 1.) In the present example, the gate of cryotron 62 is resistive due to the master control current through the control thereof. Thus the block enabling current flows through the left branch of transfer circuit 64 which includes the controls of a plurality of cryotrons 65(1) and 65(2). Thus the gates of cryotrons 65(1) and 65(2) are rendered resistive.

The next step in the sequence of the selection operation is the application of a group enabling current to a group enabling control line 66. This line, which may be considered a part of the block control circuits, includes a group enabling transfer circuit for each group such as the transfer circuits 67(1) and 67(2) for the illustrated groups. (Transfer circuits 67(1) and 67(2) constitute the signal channels from the block control circuit to the group shunt lines. Thus, these transfer circuits correspond to the AND gates 14(1) and 14(2), lines 34(1) and 34(2) and the inhibit gates 12(1) and 12(2) of the 1st block of FIG. 1.)

It will be recalled from the discussion of FIG. 1 that the group shunt circuits are controlled jointly by signals from the master and block control circuits. The group enabling transfer circuits 67(1) and 67(2) of FIG. 2 include a cryotron 68(1) and a cryotron 68(2), respectively. Cryotrons 65(1) and 68(1) and cryotrons 65(2) and 68(2) correspond to the AND gates 14(1) and 14(2), respectively, of FIG. 1, the cryotrons 65(1) and 65(2) being controlled by the master control circuit and the cryotrons 68(1) and 68(2) being controlled by the block control circuit.

In the present example, the cryotrons 65(1) and 65(2) are resistive. Cryotron 68(1) is also resistive due to the block control current on line 260 through its control. With both cryotrons 65(1) and 68(1) resistive the group enabling current on line 66 flows through the left branch of transfer circuit 67(1) and therefore through the control of cryotron 120(1), the group shunt line 110(1) control cryotron for the first group. The situation for the second group is different.

In transfer circuit 67(2), the cryotron 68(2) remains superconductive, it being recalled that the block control current was diverted from the line 260 through cryotron 53 due to the resistive gate of cryotron 52. Thus, at the transfer circuit 67(2) the group enabling current on line 66 finds both the left and right branches superconductive. However, it is arranged that the inductance of the left branch of the transfer circuit is much greater than the inductance of the right branch. Thus, the substantial portion of the group enabling current flows through the superconductive gate of cryotron 68(2), through the right branch, and returns to line 66, thus leaving cryotron 120(2) and hence the group shunt line 110(2) superconducting.

The final step in the sequence of the selection operation is the application of the SFM current to line 86. In the present example, the shunt line 110(1) is resistive due to the resistive gate of cryotron 120(1). Therefore the SFM current is directed through the selection ladder of the first group where it is diverted through cryotron 90(2) by which the selection flip-flop of the second row is placed in its set state to enable that row for read and/or write operations ts previously described.

Because the group shunt line 110(2) remains superconductive, the SFM current takes this path in preference to the higher inductance path of the selection ladder of the second group.

While for convenience of description the various control and enabling currents have been described as applied in sequence, this is not a requirement. In the circuit of FIG. 2 control currents may be simultaneously applied to group, block and master control lines 230, 260 and 320 and, in fact, these currents may be applied continuously. In such a case it is only necessary to allow a sufficient time for these control circuits to settle subsequent to an interrogation operation. Simultaneous currents can then be applied to enabling current lines 63 and 66 and to the SFM line 86 to complete the selection operation.

Thus what has been described is a selection circuit which provides a substantial decrease in the time that must be allowed for a selection operation in a content addressed memory system, or the like, as exemplified by the memory system of the previously mentioned U.S. patent application Ser. No. 269,371.

While the principles of the invention have been made clear in the illustrative embodiments, there will be obvious to those skilled in the art, many modifications in structure, arrangement, proportions, the elements, materials, and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; group indicating means responsive to said word indicating means for providing simultaneous group indications of the groups which contain at least one word storage location that provides a word indication; a plurality of selection circuits, one for each of said groups, each selection circuit being operable in response to an applied selection signal for enabling for predetermined operations the first word storage location of the corresponding group that provides a word indication; means normally operable to disable the operation of each of said selection circuits; and means responsive to said group indicating means for enabling the operation of the selection circuit of the first group providing a group indication.

2. In a memory system having a plurality of successive word storage locations, said word storage locations being organized into a plurality of successive groups and said groups being organized into a plurality of successive blocks, a circuit for selecting in turn each indicated word storage location, comprising: word indicating means associated with each of said word storage locations responsive to predetermined criteria for providing a word indication for each word storage location that conforms to said criteria; group indicating means responsive to said word indicating means for providing group indications for the groups that include at least one word storage location providing a word indication; block indicating means responsive to said group indicating means for providing block indications for the blocks that include at least one group providing a group indication; a plurality of selection circuits one for each of said groups, each selection circuit being operable in response to an applied selection signal to enable for predetermined operations the first word storage location of its group that provides a word indication; means normally operable to disable the operation of each of said selection circuits; and means responsive to said block indicating means for enabling the operation of the selection circuit of the first group providing a group indication, the selection circuits of subsequent groups remaining disabled.

3. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; group indicating means responsive to said word indicating means for providing simultaneous group indications of the groups which contain at least one word storage location that provides a word indication; a plurality of selection circuits one for each of said groups, each selection circuit being operable in response to an applied selection signal for enabling for predetermined operations the first word storage location of the corresponding group that provides a word indication, each of said selection circuits including a normally enabled shunt path for said selection signal; means responsive to said group indicating means for disabling the shunt path for said selection signal of the selection circuit of the first group providing a group indication, the shunt paths of subsequent groups remaining enabled; and means for applying a selection signal simultaneously to each of said selection circuits.

4. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; group indicating means responsive to said word indicating means for providing simultaneous group indications of the groups which contain at least one word storage location that provides a word indication; a plurality of series connected selection circuits one for each of said groups, each selection circuit comprising parallel current paths for an applied selection current, each selection circuit being operable in response to an applied selection current for enabling for predetermined operations the first word storage location of its group that provides a word indication, each selection circuit including a normally enabled shunt path for said selection current; means responsive to said group indicating means for disabling the shunt path of the selection circuit of the first group providing a group indication, the shunt paths of subsequent groups remaining enabled; and means for applying a selection current to said series connected selection circuits.

5. In a memory system having a plurality of successive word storage locations, said word storage locations being organized into a plurality of successive groups and said groups being organized into a plurality of successive blocks, a circuit for selecting in turn each indicated word storage location, comprising: word indicating means associated with each of said word storage locations responsive to predetermined criteria for providing a word indication for each word storage location that conforms to said criteria; a group control means responsive to said word indicating means for providing group indications for the groups that include at least one word storage location providing a word indication; block control means responsive to said group control means for providing block indications for the blocks that include at least one group providing a group indication; master control means responsive to said block control means for transmitting a master signal to the first block providing a block indication; a plurality of selection circuits one for each of said groups, each selection circuit being operable in response to an applied selection signal to enable for predetermined operations the first word storage location of its group that provides a word indication; means normally operable to disable the operation of each of said selection circuits; and means jointly responsive to said master signal and said group indications for enabling the operation of the selection circuit of the first group providing a group indication, the selection circuits of subsequent groups remaining disabled.

6. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; group indicating means responsive to said word indicating means for providing simultaneous group indications of the groups which contain at least one word storage location that provides a word indication; a plurality of selection circuit one for each of said groups, each selection circuit being operable in response to an applied selection signal for enabling for predetermined operations the first word storage location of its group that provides a word indication, each selection circuit including a shunt circuit for said selection signal, said shunt circuit including a normally enabled inhibit gate for controlling said shunt circuit; means responsive to said group indications for producing a master signal; and means jointly responsive to said master signal and the first group indication for disabling the inhibit gate of the selection circuit of the group providing said first group indication.

7. In a content addressed memory having a plurality of bit storage cells arranged in rows and columns, having interrogation means for performing an interrogation of selected columns and having indicating means responsive to said interrogation means for providing a match indicating signal for each row that contains stored bits which match said interrogation, a select first match circuit responsive to said indicating means for selecting for predetermined operations only the first indicated row, comprising: a plurality of group indicating circuits, one for each of successive groups of said rows, each group indicating circuit being responsive to match indicating signals to provide a group indicating signal when at least one row of its group provides a match indicating signal; a normally disabled selection circuit for each group, each enabled selection circuit being operable in response to an applied selection signal for enabling the first indicated row of its group for selection; and means responsive to said group indicating signals for enabling the selection circuit of the first group providing a group indicating signal, the selection circuits of subsequent groups remaining disabled.

8. In a content addressed memory having a plurality of bit storage cells arranged in rows and columns, having interrogation means for performing an interrogation of selected columns and having indicating means responsive to said intrrogation means for providing a match indicating signal for each row that contains stored bits which match said interrogation, a select first match circuit responsive to said indicating means for selecting for predetermined operations only the first indicated row, comprising: a plurality of group indicating circuits, one for each of successive groups of said rows, said group indicating circuits being responsive to said indicating means to provide simultaneous group indicating signals, one for each group wherein at least one row provides a match indicating signal; a plurality of block indicating circuits, one for each of successive blocks of said groups, said block indicating circuits being responsive to said group indicating signals to provide simultaneous block indicating signals, one for each block wherein at least one group provides a group indicating signal; a master control circuit responsive to said block indicating signals to transmit a master signal corresponding to the first block providing a block indicating signal; a plurality of selection circuits, one for each of said groups, each enabled selection circuit being operable in response to an applied selection signal for enabling the first indicated row of its group for selection; and means jointly responsive to said group indicating signals and said master signal for enabling the selection circuit of the first group providing a group indicating signal.

9. In a content addressed memory having a plurality of bit storage cells arranged in rows and columns, having interrogation means for performing an interrogation of selected columns and having indicating means responsive to said interrogation means for providing a match indicating signal for each row that contains stored bits which match said intrrogation, a select first match circuit responsive to said indicating means for selecting for predetermined operations only the first indicated row, comprising: a plurality of series connected group indicating circuits, one for each of successive groups of said rows, each group indicating circuit comprising first and second parallel superconductive lines; means for applying a group control current to said group indicating circuits; means in each group indicating circuit responsive to a match indicating signal for directing said group control current into said second superconductive line; means responsive to said group control current in said second superconductive line of each group indicating circuit for producing a group indicating signal; a normally disabled selection circuit for each group, each enabled selection circuit being operable in response to an applied selection signal for enabling the first indicated row of its group for selection; means responsive to said group indicating signals for enabling the selection circuit of the first group providing a group indicating signal; and means for applying a selection signal to said selection circuits.

10. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; a plurality of series connected group indicating circuits, one for each of said groups, each group indicating circuit comprising a first superconductive group control line and a second superconductive group control line connected in parallel with said first group control line; means for applying a group control current to said group indicating circuits; cryotron means in each group control circuit responsive to a word indication from at least one word storage location of its group for directing said group control current into said second superconductive group control line; cryotron means responsive to said group control current in said second superconductive group control line for producing group indicating signals; a normally disabled selection circuit for each group, each enabled selection circuit being operable in response to an applied selection signal for enabling for predetermined operations the first word storage location that provides a word indication; means responsive to said group indicating signals for enabling the selection circuit of the first group providing a group indicating signal; and means for applying a selection signal to said selection circuits.

11. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; a plurality of series connected group indicating circuits, one for each of said groups, each group indicating circuit comprising a first superconductive group control line and a second superconductive group control line connected in parallel with said first group control line; means for applying a group control current to said group indicating circuits; cryotron means in each group control circuit responsive to a word indication from at least one word storage location of its group for directing said group control current into said second superconductive group control line; cryotron means responsive to said group control current in said second superconductive group control line for producing a group indicating signal; a plurality of series connected block indicating circuits, one for each of successive blocks of said groups, each block indicating circuit comprising a first superconductive block control line and a second superconductive block control line connected in parallel with said first block control line; means for applying a block control current to said block indicating circuits; cryotron means in each block control circuit responsive to a group indicating signal from at least one group of its block for directing said block control current into said second superconductive block control line; cryotron means responsive to said block control current in said second superconductive block control line for producing a block indicating signal; a master control circuit comprising first and second superconductive master control lines and first and second cryotron means for each block; means for applying a master control current to said first master control line, said first cryotron means being responsive to said master control current in said first master control line for producing a master signal, said second cryotron means being responsive to a block indicating signal for directing said master control current from said first master control line into said second master control line; a normally disabled selection circuit for each group, each enabled selection circuit being operable in response to an applied selection signal for enabling for predetermined operations the first word storage location that provides a word indication; cryotron means jointly responsive to said master signal and said group control current in said first group control line for enabling the selection circuit of the first group providing a group indicating signal; and means for applying a selection signal to said selection circuits.

12. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; a plurality of series connected group indicating circuits, one for each of said groups, each group indicating circuit comprising a first superconductive group control line and a second superconductive group control line connected in parallel with said first group control line; means for applying a group control current to said group indicating circuits; cryotron means in each group control circuit responsive to a word indication from at least one word storage location of its group for directing said group control current into said second superconductive group control line; cryotron means responsive to said group control current in said second superconductive group control line for producing group indicating signals; a plurality of selection circuits, one for each of said groups, each selection circuit being operable in response to an applied selection signal for enabling for predetermined operations the first word storage location that provides a word indication, each selection circuit including a normally enabled superconductive shunt circuit for said selection signal; cryotron means responsive to said group indicating signals for disabling the shunt circuit of the selection circuit of the first group providing a group indicating signal; and means for applying a selection signal to said selection circuits.

13. In a memory system having a plurality of successive groups of sequentially ordered word storage locations, a circuit for selecting in turn each indicated word storage location, comprising: word indicating means associated with each of said word storage locations responsive to predetermined criteria for providing a word indication for each word storage location that conforms to said criteria; a plurality of series connected group indicating circuits, one for each of said groups, each group indicating circuit comprising a first superconductive group control line and a second superconductive group control line connected in parallel with said first group control line; means for applying a group control current to said group indicating circuit; cryotron means in each group control circuit responsive to a word indication from at least one word storage location of its group for directing said group control current into said second superconductive group control line; cryotron means responsive to said group control current in said second superconductive group control line for producing a group indicating signal; a plurality of series connected block indicating circuits, one for each of successive blocks of said groups, each block indicating circuit comprising a first superconductive block control line and a second superconductive block control line connected in parallel with said first block control line; means for applying a block control current to said block indicating circuits; cryotron means in each block control circuit responsive to a group indicating signal from at least one group of its block for directing said block control current into said second superconductive block control line; cryotron means responsive to said block control current in said second superconductive block control lines for producing a block indicating signal; a master control circuit comprising first and second superconductive master control lines and first and second cryotron means for each block; means for applying a master control current to said first master control line, said first cryotron means being responsive to said master control current in said first master control line for producing a master signal, said second cryotron means being responsive to a block indicating signal for directing said master control current from said first master control line into said second master control line; a plurality of selection circuits, one for each of said groups, each selection circuit being operable in response to an applied selection current for enabling for predetermined operations the first word storage location that provides a word indication, each selection circuit including a normally enabled superconductive shunt circuit for said selection current; cryotron means jointly responsive to said master signal and said group control current in said first group control line for disabling the shunt circuit of the selection circuit of the first group providing a group indicating signal.

References Cited

UNITED STATES PATENTS 3,290,661 12/1966 Belcourt ------------ 340—173

TERRELL W. FEARS, *Primary Examiner.*

U.S. Cl. X.R.

340—172.5